United States Patent
Bleile et al.

(10) Patent No.: US 6,216,922 B1
(45) Date of Patent: *Apr. 17, 2001

(54) GLASS BOTTLE WITH A SPRAYED ON SYNTHETIC COATING, ITS PRODUCTION PROCESS AND DEVICE NECESSARY FOR ITS PRODUCTION

(75) Inventors: Erwin Bleile, Neuenburg; Andreas Geiger, Worrstadt; Jochen Heinz, Vendersheim; Reinhard Schluter, Heitersheim; Michael Spallek, Ingelheim; Michael Reinhard, Ober-Olm, all of (DE)

(73) Assignee: Schott Glaswerke (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/397,119

(22) Filed: Sep. 16, 1999

Related U.S. Application Data

(63) Continuation of application No. 08/905,937, filed on Aug. 5, 1997, now Pat. No. 5,979,714.

(30) Foreign Application Priority Data

Aug. 14, 1996 (DE) .............................................. 196 32 664

(51) Int. Cl.⁷ .................................................. B65D 83/00
(52) U.S. Cl. ..................................... 222/402.1; 222/481.5
(58) Field of Search ............................ 222/402.1, 402.16, 222/481.5

(56) References Cited

U.S. PATENT DOCUMENTS

| | | | |
|---|---|---|---|
| 2,929,525 | 3/1960 | Glover et al. | 215/12 |
| 3,143,250 | 8/1964 | Pengue | 222/182 |
| 3,986,248 | 10/1976 | Meshberg et al. | 29/458 |
| 4,099,638 | 7/1978 | Tatsumi et al. | 215/12 R |
| 4,161,556 | 7/1979 | Lenard et al. | 427/385 |
| 5,224,630 | 7/1993 | Pope et al. | 222/183 |
| 5,979,714 | * 11/1999 | Bleile et al. | 222/402.1 |

FOREIGN PATENT DOCUMENTS

| | | |
|---|---|---|
| 2259755 | 12/1971 | (DE) . |
| 2368346 | 10/1976 | (FR) . |
| 2631581 | 5/1998 | (FR) . |
| 902300 | 8/1960 | (GB) . |
| 1424460 | 2/1976 | (GB) . |
| 1434100 | 4/1976 | (GB) . |
| 2109333 | 6/1983 | (GB) . |
| 2214891 | 9/1989 | (GB) . |
| 1420172 | 1/1976 | (JP) . |

OTHER PUBLICATIONS

European Patent Office Search Report EP 97 113286 dated Nov. 26, 1997.

* cited by examiner

Primary Examiner—Joseph A. Kaufman
(74) Attorney, Agent, or Firm—George T. Marcou; Kilpatrick Stockton LLP

(57) ABSTRACT

The invention consists of a glass bottle (1) fitted with a narrowed neck (2) which can be filled under pressure with chiefly a medically active substance sprayable by aerosol and with a propellant and which exhibits an opening which may be closed using a dosage valve (5). This glass bottle (1) has a sprayed on synthetic coating (4) to protect it against shattering and splintering, preventing the user from being injured by the broken bottle.

To substantially enhance this safety, the neck (2) of the bottle (1) has been fitted with a bulge like edge (3) at the opening which is also coated with the synthetic material (4) and onto which the dosage valve (5) is mechanically attached by turning. Furthermore, the coating (4) consists of an elastic synthetic material with pronounced increased shrinkage properties used for the summoning of pre-stressing force on the glass body (1) and it exhibits several hole like pressure relieving openings (7) permitting rapid pressure release in case of shattering.

14 Claims, 3 Drawing Sheets

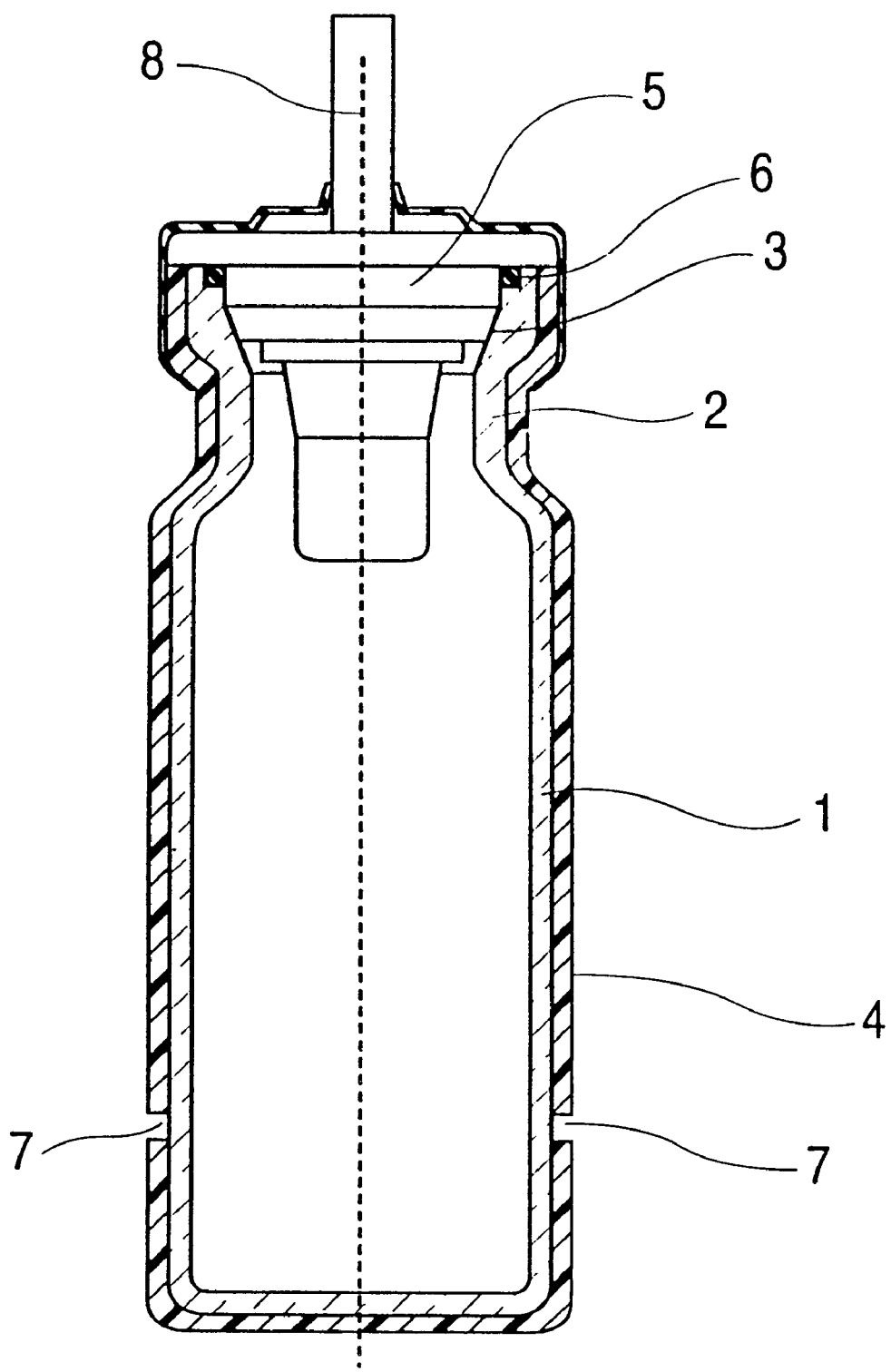

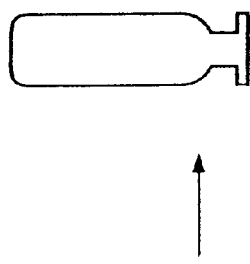
FIG. 2A  HEATING
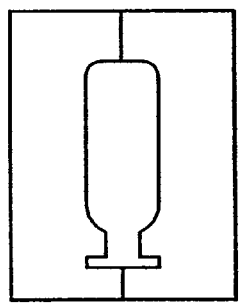
FIG. 2B  SPRAYING
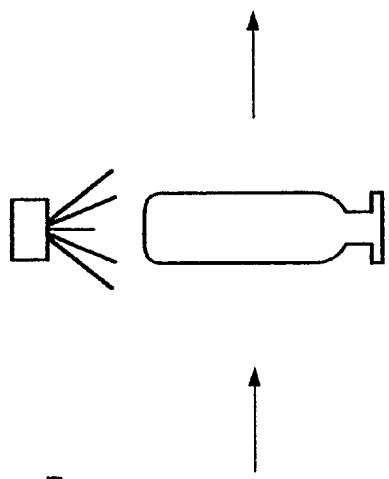
FIG. 2C  SPRAYING OF ENTIRE BOTTLE
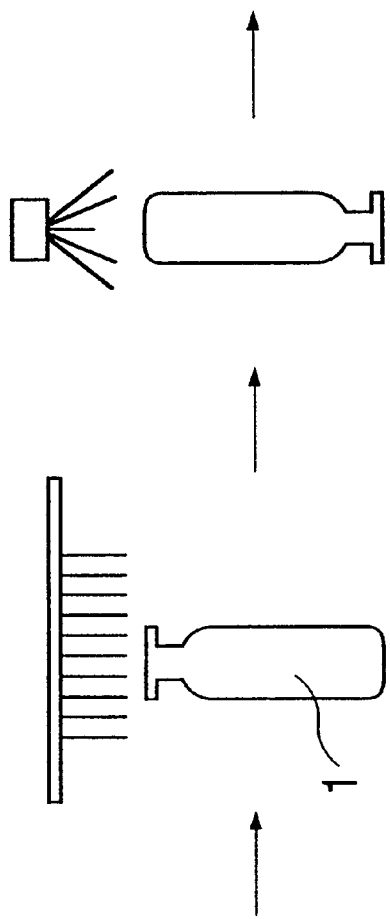
FIG. 2D  PACKING

GLASS BOTTLE WITH A SPRAYED ON SYNTHETIC COATING, ITS PRODUCTION PROCESS AND DEVICE NECESSARY FOR ITS PRODUCTION

This application is a Continuation of Ser. No. 08/905,937, filed Aug. 5, 1997, now, U.S. Pat. No. 5,979,714.

FIELD OF THE INVENTION

The invention consists of a glass bottle with a sprayed on synthetic coating as described in patent claim 1. Furthermore, the invention consists of the process for the production of the spray coated glass bottle and of a device used for the implementation of the process.

BACKGROUND

Different types of glass containers coated with a synthetic material using different coating methods and different synthetic materials are well-known from numerous publications.

In this manner a solvent free polyurethane is applied in a specific blend of predetermined thickness and/or tension firmness and flexibility to a glass container in patent number DE 23 12 694 C3.

DE 27 09 451 C2 describes a coated glass bottle, its upper exterior surface coated with a layer of a thermally hardening material which is developed from a powder that contains a mixture of a locked organic polyisocyanate and a hydrolyzed ethyl vinylesthercopolymer and/or a carboxyl modified version of the hydrolyzed copolymer.

DE-AS 26 09 931 describes a method by which a mixture of an elastomer organic polymer and an organic peroxide compound is applied to the surface of a glass container and the way in which this coating mixture is applied in situ using an energy charge in such a way that the polymer is cross linked.

The process by which the coating and/or encasings of a glass bottle is applied using high pressure is known from DE-AS 23 37 331 and DE-OS 23 30 804.

This protective synthetic coating ensures that shards of broken glass are held together should the coated glass container break. In this manner, the synthetic coating functions to protect against shattering and splintering.

The above described glass container technique pertains to beer bottles, cosmetics containers and other similar containers.

However, the present invention relates to a special form of container, namely pressurized containers, which are filled under pressure with, in particular, medically active substances and a propellant and which are closed using an dispensary organ, particularly a dosage valve, over the opening. When using a delivery head, which works with the dispensary organ in such a manner that when both parts are pressed together, the dispensary organ is activated and a predetermined dosage of the medically active substance is released as aerosol through a spray nozzle, these products are used as an applicator for medical uses, in particular for use by asthmatics and other people suffering from bronchia.

Such applicators generally consist of pressurized containers made from metallic materials. Such containers are protected against shattering and splintering by use of a material not prone to shattering (durability and strength).

The disadvantage of these pressurized containers, however, is that the non transparent material does not allow visual determination of the amount of substance remaining to be administered. This is particularly a disadvantage because inhalant preparations often are utilized in emergency treatment (for example asthma medication). When visual determination of the contents of the container is not possible, the container could be empty when emergency medication would be necessary.

Pressurized containers in the form of a glass bottle are also well-known. The content volume of the bottles can vary between 5–50 ml. The upper end of the bottle is fitted with the outflow opening. Generally, this opening is closed by the pressing on and/or bending of the dispensary organ on the pressurized container, for example a dosage valve with a usually cylindrical upward reaching cannula, often used with an elastic seal between the head and the dosage valve.

The well known pressurized glass container is coated with a transparent synthetic material which is sprayed on or into which it is dipped except for the rim on which the dosage valve is attached. This coating consists of a very flexible soft synthetic material, for example PVC. The strechable effect is important since the pressure build-up caused by the shattering of the container affects the soft synthetic material. Should the soft synthetic material not be able to give by changing volume when exposed to pressure, a sudden soft synthetic material destruction caused by dissolving or stress corrosion is to be expected.

This well-known pressurized container has the advantage that the use of a transparent material (glass) and a transparent synthetic coating allows easy determination of the amount of substance remaining in the container.

The disadvantage of the pressurized container is that the transparent pressurized glass container is not safe in case of explosion, caused for example from improper handling, despite being coated with a synthetic material, since the coating especially in the area of the dosage valve cannot prevent pieces of the glass container from being shot out into the surrounding area because the coating will billow out in a balloon like fashion.

Also well-known are applicators (GB 2 109 333 A) which in the framework of the assembly of the applicator, show the glass pressurized container fitted with a closely fitting shell portion, a protective shield. This concept has the disadvantage that the production and assembly expenditure is higher. The same applies to the well-known applicator GB 2 214 891, which consists of a flexible synthetic pressurized container housed in a solid synthetic shell portion.

However, this invention depends on the unusual concept that in the framework of the production of the final pressurized container, the synthetic shattering and splintering protection shield is applied directly onto the glass pressurized container by covering it with an extruded thermoplastic using injection molding equipment Such a conception is well-known from FR 2 631 581 B1. This publication describes the initially mentioned glass bottle with a narrowed neck, which can be filled under pressure with a substance that can be sprayed as an aerosol and with a propellant. The opening is closed with a dispensary organ and the bottle is sprayed with a synthetic covering.

In the best known case, the glass pressurized container consists of a bottle with a cylindrical neck and the injection mold is fashioned in such a way that both the neck and the bottle opening are sprayed with the synthetic material. However, the safe placement of the dispensary organ of the dosage valve is not without problems when the neck of the bottle is designed in this fashion. The synthetic coating covers the entire glass bottle. If the glass bottle shatters, the shatter and splinter protection properties may be lost because the coating partially billows out and bursts. No mention is made of the kind of synthetic material used in the above mentioned publication suggesting that it is not considered critical to the function of the invention.

SUMMARY OF THE INVENTION

The present invention was developed to create a glass pressurized container in the shape of a bottle with a sprayed on synthetic coating in such a way as to make possible the safe attachment of the dispensary organ and a reduction of the wall strength of the glass bottle and to markedly increase the shatter and splinter protection properties of the above mentioned containers.

The solution to this task is offered by the initially described bottle in accordance with the invention in the following ways:

the neck of the bottle has a bulge like edge at the opening which is also sprayed with the synthetic coating, to facilitate the mechanical attachment of the dispensary organ, in the sprayed on synthetic coating on the glass body there are several hole like pressure relieving openings, the coating consists of an elastic synthetic material with substantially increased shrinkage properties and it is shrunken onto the glass bottle.

The bulge like edge facilitates a safe and lasting mechanical manner to attach the dispensary organ. Should the glass body shatter, the dispensary organ will remain mechanically fastened since the edge is also coated with the synthetic coating, a fact which increases the shatter protection factor. The pressure relieving holes prevent the billowing out of the synthetic coating which also substantially increases shatter and splinter protection.

In case of shattering, the substance and propellant contained in the bottle can escape through the pressure relieving holes. This escape of the contents of the glass bottle decreases the danger of a chemical reaction between the substance contained in the bottle and the coating material (stress corrosion) as well as decreasing the resulting risk of explosion.

The use of an elastic synthetic material with particularly high shrinkage properties (shrinkability) surprisingly revealed that the pressure load capacity of the sprayed glass bottle was remarkably higher than that of an untreated glass bottle. This fact allows the use of a thinner glass bottle wall strength. In this manner the elasticity of the synthetic material compensates for the shrinkage.

Preferred synthetic materials to use are polypropylene (PP) or polyethylene (PE) or a polyamide (PA). The use of polycarbonate is also possible.

In accordance with a further development of the invented bottle the pressure relieving openings are designed in the cylindrical shell portion of the bottle body near the bottom area, preferably four of them lying across from each other in pairs. This shape permits in the easiest manner the shaping of the pressure relieving openings using the spring loaded centering pins of the injection mold, which also holds the bottle in place during the injection molding process.

The glass bottle of the invention are sold in various stages of elaboration. The basic shape bottle is sold without a dispensary organ attached. It can also be delivered with a pre-attached dispensary organ. The glass bottle may be sold empty or pre-filled. However, all these variations still use the invented bottle and benefit from the protection offered.

The production process involved to achieve the benefits of the invented glass bottle will include the following process:

Production of the entire glass bottle including bottom, cylindrical shell portion, narrowed neck with a bulge like edge in accordance with conventional glass technology, silicone oil treatment of the outer surface of the glass bottle coming out of the cooling station on the production line and final heating, spraying of the entire bottle including the edge with an elastic synthetic material with distinctive shrinking properties, shaping of hole like pressure relieving openings in the synthetic coating.

The surface treatment of the glass bottle allows improved flowing properties of the synthetic material in the mold and furthermore prevents possible chemical or physical reactions between the glass and synthetic materials as well as a freezing of the surface of the glass after the cooling stage.

The proper placing of the synthetic coating on the previously produced glass bottle is achieved using injection molding equipment designed to fit the bottle shape and to which the extruded synthetic material can be supplied and which is fitted with a centered finger-like contraption which holds the bottle in place and spring loaded vertical crosspieces which lie closely adjacent to the bottle shell portion during the molding process shaping the pressure relieving openings.

The invented glass bottle is very easy to produce using this equipment.

BRIEF DESCRIPTION OF THE DRAWINGS

Further characteristics, advantages and usage possibilities of the invention are evident from the description of the execution examples in the drawings. They show:

FIG. 1 The invented glass bottle, in the ratio 2:1, sprayed with a synthetic material, FIG. 2 a schematic representation of process involved in the production of the bottle in FIG. 1, FIG. 3 a detailed schematic representation of the injection molding equipment from FIG. 2.

DETAILED DESCRIPTION

Figure 3:
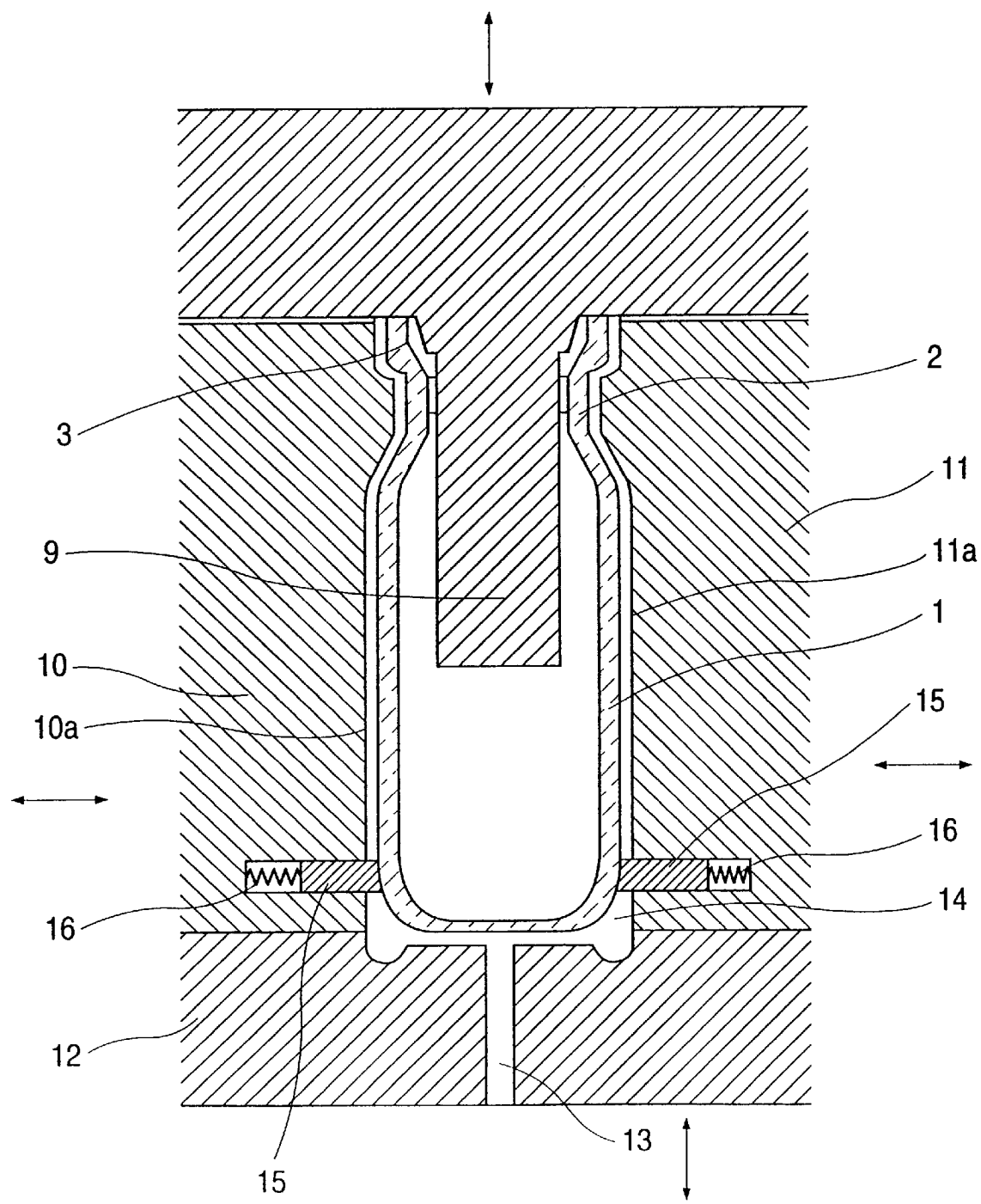

FIG. 1 exhibits a pressurized container in the shape of a glass bottle 1 with a narrowed neck 2 which exhibits a bulge like edge 3 at the opening. The glass bottle could be made of, for example, borosilicate glass or a lime sodium glass. The shape of the bottle is solely determined by its resistance to pressure. In the present representation the glass bottle should be capable of being filled under pressure with, in particular, a medically active substance which is sprayable as an aerosol and a propellant. It must then be able to resist pressure of up to 15 bar.

The glass bottle represented in FIG. 1 is 54 mm high with an outer diameter of 20 mm which means that the height to diameter ratio is approximately 3.4. This ratio is preferred for the invented bottle.

The glass bottle 1 as described in detail in FIGS. 2 and 3 has been sprayed with a coating 4 made from an elastic, preferably transparent or opaque synthetic material which has improved hardening properties and with pronounced shrinkability. The elasticity is necessary to balance out the heavy shrinkage. The heavy shrinkage exposes the glass bottle to a pre-stressing force, similar to the force observed in prestressed concrete, so that the pressure resistance of the sprayed glass bottle, surprisingly, is many times higher than that of the untreated glass bottle. This fact allows the use of a relatively low glass wall strength. In the present example the glass wall is 1.5 mm with a coating thickness of 1 mm. Synthetic materials used for this purpose are, in particular: polypropylene (PP), polyethylene (PE) or a polyamide (PA). The shrinkage is on the scale of 0.6–2% (volumetric percentage).

The use of injection molding equipment to apply the synthetic coating has the advantage over, for example, the dipping method, that unevenness on the outer surface of the glass bottle can be smoothed out and that alternative shapes to the bottle shape are possible, for example a coating with a completely level bottom would allows good stability of the sprayed glass bottle while it is being filled. The bottom area of the glass bottle could then be arched outwards in a half circular shape to reduce to a minimum the tensile stress.

The opening of the bottle may be closed using a dispensary organ 5 with the insertion of a seal 6 which is mechanically attached to the bulge like edge 3 by turning and/or bending it on. The bottle edge is, in this case tapered, in order to achieve a high sealing effect. The dispensary organ in the present example is in the form of a dosage valve. As can be seen in FIG. 1, the synthetic coating 4 also covers the bulge like edge 3. The dispensary organ 5 will be held in place mechanically even if the glass edge breaks, which significantly improves the shattering safety.

Several hole like openings 7 are present in the synthetic coating 4 of which two can be seen in FIG. 1. Preferably four such openings will be positioned across from each other in pairs. The pressure relieving openings 7 will preferably be positioned in the cylindrical shell portion of the coating 4 on the bottle body 1. This is due to the injection molding equipment which is described in more detail in FIG. 3. Should the bottle shatter, the pressure relieving openings 7 prevent the synthetic coating from billowing out, since the substance and propellant contained in the bottle can escape through the pressure relieving openings 7 when the interior pressure quickly declines. The danger of a chemical reaction between the substance contained in the bottle and the coating material due to stress corrosion is diminished as is in turn the danger of explosion.

The glass pressurized container 1 is filled in such a manner that the substance(es) to be delivered is filled in alone or in conjunction with the propellant(s) through the dosage valve 5.

In preparation for the filling process the glass pressurized container 1 is pushed into a cylindrical part (not shown) fitted with a delivery head which allows the cylindrical cannula 8 of the dosage valve 5 to be snugly directed into a equally cylindrical hollow receiver which is connected to a channel. The channel usually ends in an opening shaped in the form of a spray nozzle located on the end wall of the delivery head.

The delivery head may be fitted with a mouth or nose piece which, in some cases, may be protected against dirt with a removable cap. Such delivery heads are well known in the area of medicinal technology and therefore do not require any further description at this point.

FIGS. 2 and 3 will describe the preferred production method of the spray coated glass bottle in FIG. 1.

The first production step involves the production of the entire glass bottle 1, in accordance with conventional glass technology, including bottle bottom, cylindrical shell portion, and narrowed neck fitted with a bulge like edge. Since this technique is well known it is not described in further detail in FIG. 2.

The outer surface of the glass bottle is sprayed with a silicone oil (step B) after coming out of the cooling station (step A) and it is finally heated. This surface treatment improves the flowing properties of the synthetic material in the mold and prevents chemical or physical reactions between glass and synthetic material.

The silicone treatment of the outer surface of the glass bottle creates an intermediate silicone layer between the glass bottle and the synthetic coating which is very thin and therefore is not shown in FIG. 1.

In step C the entire bottle is spray coated with the elastic synthetic material and the hole like pressure relieving openings are shaped. The injection molding equipment used for this process is schematically described in more detail in FIG. 3. The production then ends in step D with the packaging of the spray coated glass bottle.

The injection molding equipment in FIG. 3 for the glass bottle 1 including the neck 2 and the edge 3 basically consists of a knob or a tongue 9 onto which the glass bottle is attached or held in place and of two blocks 10, 11 which are movable in the direction of the arrows, and which have two interior surfaces 10a, 11a which conform to the shape of the glass bottle and also have a bottom part 12 with an opening 13, which on the one hand are connected to the gap 14 between the glass bottle 1 and the surfaces 10a, 11a and on the other hand to an extruder which is not shown and which serves to supply the synthetic material to be sprayed.

Furthermore, the injection molding equipment is fitted with equipment which exhibits finger-like crosspieces 15 which hold the glass bottle 1 centered and which lie close to the shell portion of the glass bottle shaping the hole like pressure relieving openings.

The finger like crosspieces 15 are, in this case, spring loaded 16 and mechanically fastened in a conventional manner in the blocks 10.

In FIG. 3 two crosspieces 15 are shown. Preferably four such crosspieces should be placed in pairs across from each other.

To commence the injection molding the glass bottle 1 is pushed onto the knob 9. The blocks 10, 11 are then pushed together until they reach the point at which a gap 14 is formed, its size determined by the intended thickness of the coating. Finally, the bottom 12 is moved towards the blocks 10, 11 and the synthetic material is ejected from the extruder through the bore hole 13 into the mold. While generally a re-injection of the synthetic material would occur at this time, to minimize the shrinkage, virtually no so-called re-injection is used in the production of the present invention in order to achieve a high level of shrinkage. After the injection molding the glass bottle 1 is in the usual manner taken out of the injection molding equipment with the shrunken synthetic coating 4 (FIG. 1) and placed in step D of FIG. 2.

FIG. 3, naturally, exhibits a particularly advantageous method; other injection molding conditions are possible.

What is claimed is:

1. A glass bottle having a body with a narrowed neck, the bottle having an outer surface and an opening, the bottle being fillable under pressure with an aerosol sprayable substance and a propellant, the opening being sealable with a dispensary organ having a mechanical attachment, the outer surface of the bottle having thereon a synthetic coating;

wherein the coating is shrunk onto the glass bottle; and wherein the neck exhibits a bulge like edge at the opening which allows the mechanical attachment of the dispensary organ, the bulge like edge having thereon the synthetic coating; and wherein at least one pressure relieving opening is located in the synthetic coating of the glass bottle.

2. The glass bottle in accordance with claim 1, wherein the synthetic coating comprises at least one selected from the group consisting of Polypropylene, Polyethylene, and a Polyamide.

3. The glass bottle in accordance with claim 1, wherein the bottle has a bottom area, and wherein the coating has a cylindrical shell portion, characterized by the fact that the pressure relieving openings are formed in the cylindrical shell portion of the coating on the glass bottle near the bottom area.

4. The glass bottle in accordance with claim 3, further comprising four pressure relieving valves, characterized by the fact that the four pressure relieving openings are laid across from each other in pairs.

5. The glass bottle in accordance with claim 1, wherein the glass bottle has an outer surface, characterized by the fact that between the outer surface of the glass bottle and the synthetic coating is located a silicone layer derived from the silicone spraying of the glass bottle surface.

6. The glass bottle according to claim 1, wherein the synthetic coating is formed on the outer surface of the bottle by injection molding.

7. The glass bottle according to claim 1, wherein the glass bottle body comprises a single glass wall.

8. The glass bottle according to claim 7, wherein the single glass wall has a thickness of about 1.5 mm.

9. The glass bottle according to claim 1, wherein the coating applies a prestressing force to the body of the glass bottle.

10. A glass bottle with an opening fillable under pressure with an aerosol sprayable substance and a propellant, the opening being sealable with a dispensary organ, the bottle comprising:
   a single-walled inner glass body;
   an outer coating comprising an elastic synthetic material, wherein the coating is shrunk onto the glass bottle;
   a narrowed neck portion with a bulge like edge at the opening, wherein the bulge like edge is coated with the synthetic coating, the bulge like edge allowing the mechanical attachment of the dispensary organ; and
   at least one pressure relieving opening in the outer synthetic coating of the glass bottle.

11. The glass bottle of claim 10, wherein the synthetic coating includes at least one selected from the group consisting of Polypropylene, Polyethylene and a Polyamide.

12. The glass bottle of claim 10, wherein the glass bottle has a bottom area, wherein the coating includes a cylindrical shell portion, and wherein the pressure relieving openings are formed in the cylindrical shell portion of the coating on the glass bottle near the bottom area.

13. The glass bottle of claim 12, wherein the at least one pressure relieving opening comprises four pressure relieving openings, the four pressure relieving openings being located in opposing pairs.

14. The glass bottle of claim 10, wherein a silicone layer is located between the inner glass body and the outer synthetic coating, the silicone layer being sprayed on the inner glass body before coating.

* * * * *